United States Patent
Beresniewicz et al.

(10) Patent No.: US 7,225,103 B2
(45) Date of Patent: May 29, 2007

(54) AUTOMATIC DETERMINATION OF HIGH SIGNIFICANCE ALERT THRESHOLDS FOR SYSTEM PERFORMANCE METRICS USING AN EXPONENTIALLY TAILED MODEL

(75) Inventors: John M. Beresniewicz, San Mateo, CA (US); Amir Najmi, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 57 days.

(21) Appl. No.: 11/173,525

(22) Filed: Jun. 30, 2005

(65) Prior Publication Data

US 2007/0005297 A1    Jan. 4, 2007

(51) Int. Cl.
G06F 19/00        (2006.01)
(52) U.S. Cl. .......................................... 702/179; 700/26
(58) Field of Classification Search ................. 702/179, 702/181, 182–185; 700/9, 19, 26
See application file for complete search history.

(56) References Cited

U.S. PATENT DOCUMENTS 6,675,128 B1    1/2004    Hellerstein .................. 702/182

2006/0243055 A1*  11/2006    Sundermeyer et al. ........ 73/760

OTHER PUBLICATIONS

Don Burleson, "Oracle 10g Predictive Modeling", Burleson Consulting, (Prior to Jun. 30, 2005), pp. 1-6.
Randall C. Kennedy, "APM gets smart with ProactiveNet's latest", InfoWorld, Oct. 1, 2004, pp. 1-3.
David Comer & Mike Fobor (Product Managers), "Capabilities and Value of AppManger® Performance Profiler", NetConnect 2005, netiQ, pp. 1-15.

* cited by examiner

*Primary Examiner*—Edward Raymond
(74) *Attorney, Agent, or Firm*—Silicon Valley Patent Group LLP; Omkar Suryadevara

(57) ABSTRACT

A computer is programmed to fit exponential models to upper percentile subsets of observed measurements for performance metrics collected as attributes of a computer system. The subsets are defined from sets chosen to reduce model bias due to expected variations in system performance, e.g. those resulting from temporal usage patterns induced by end users and/or workload scheduling. Measurement levels corresponding to high cumulative probability, indicative of likely performance anomalies, are extrapolated from the fitted models generated from measurements of lower cumulative probability. These levels are used to establish and to automatically set warning and alert thresholds which signal to (human) administrators when performance anomalies are observed.

16 Claims, 11 Drawing Sheets

FIG. 2A

Address: Database Instance: database > Metric Baselines:

Metric Baselines

Accumulated trailing data 19 days (of 21 day retention)
Change AWR Retention

Configure Active Baseline

○ None Configured

⦿ Moving window — 252 — Trailing 21 days ▾   Time Partition   By Day of Week ▾ — 251
   None
   By Day and Night
   By Weekdays and Weekend
   By Day and Night, over Weekdays and Weekend
   By Day of Week
   By Day and Night, per Day of Week
   By Hour of Day ☑ TIP Moving baselines (recommended) accommodate evolving syst ○ Static baseline — ▾   Time Partition   N/A
   253            Time Period   N/A (Set Adaptive Thresholds) (Revert) (Apply)    (Disable)

Related Links — 254

Baseline Normalized Metrics     Manage Static Metric Baselines

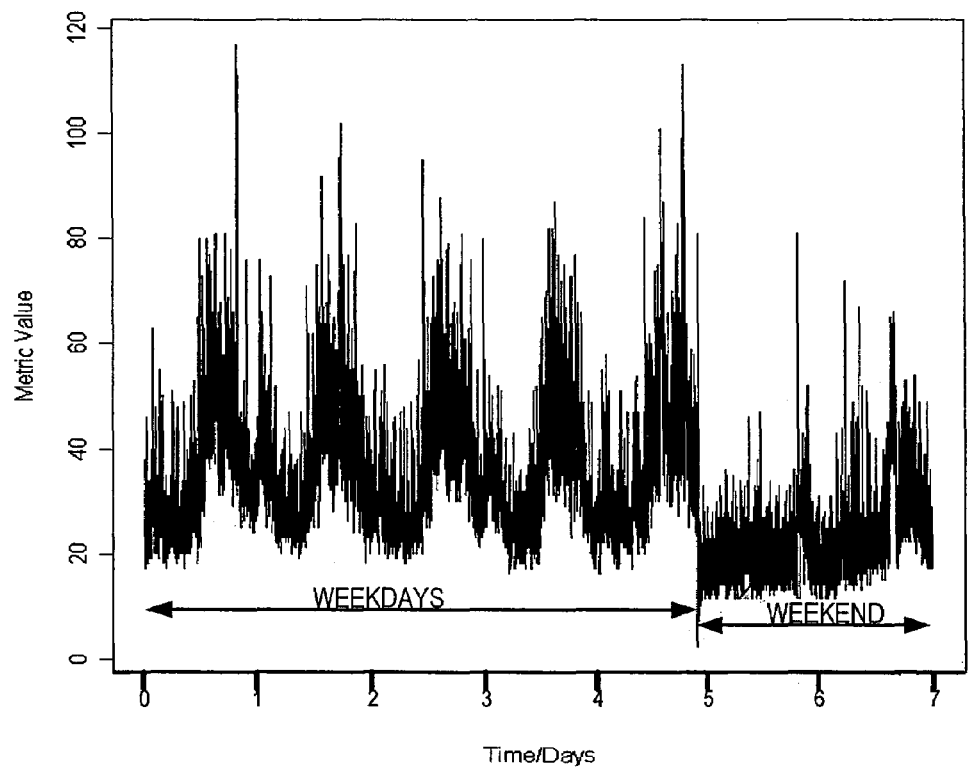

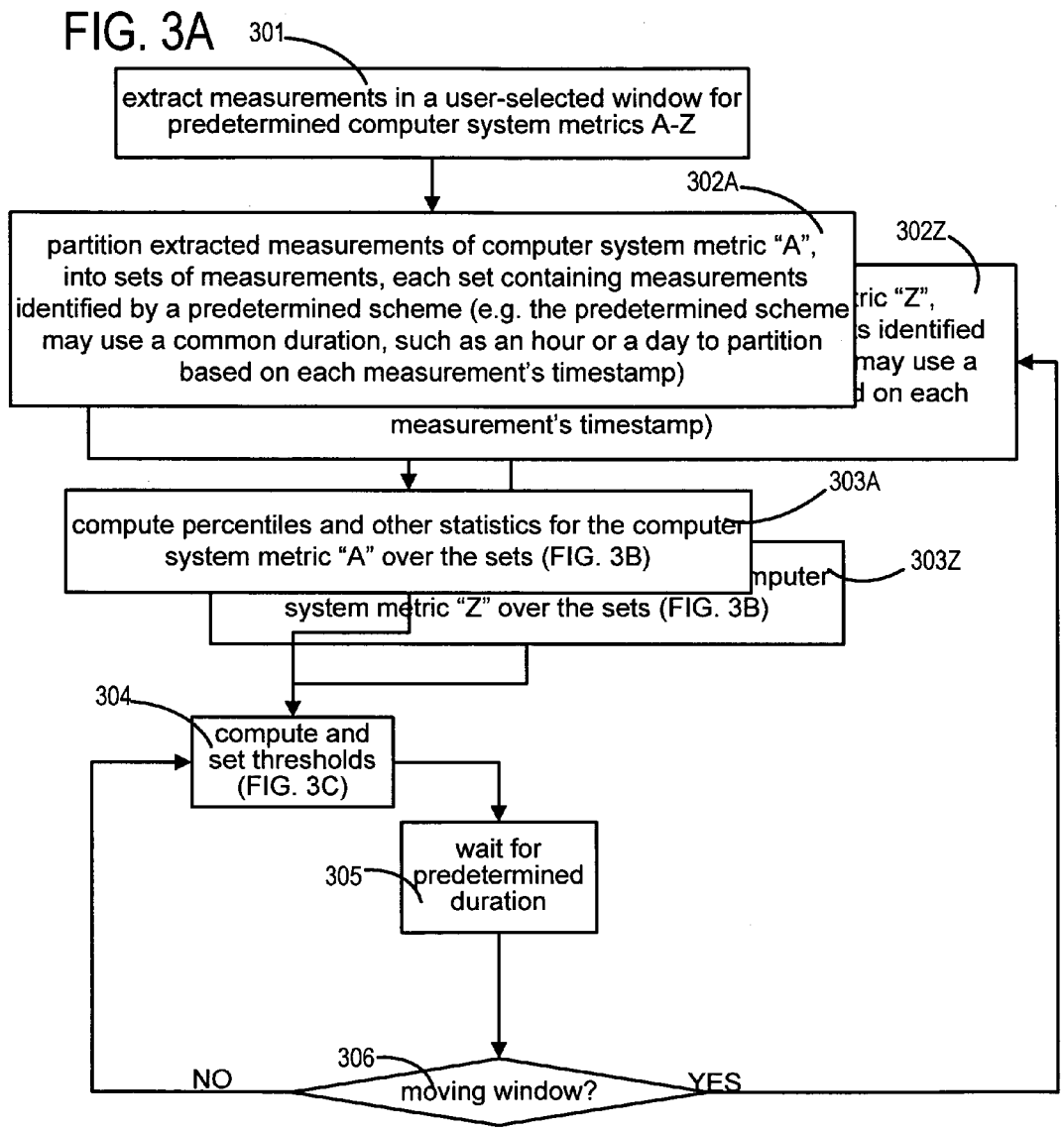

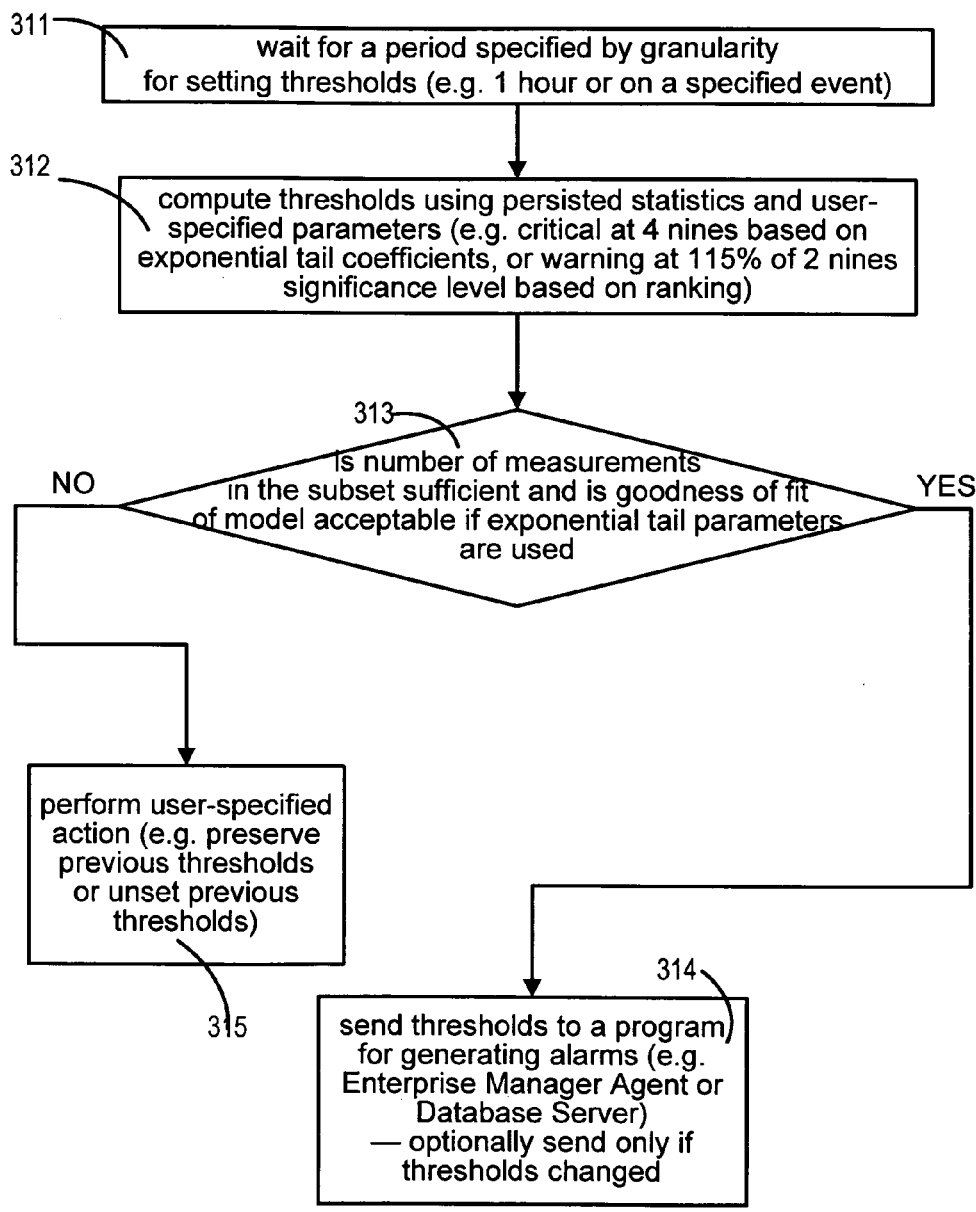

Database Instance: database > Metric Baselines > Manage Adaptive Thresholds > Configure Adaptive Thresholds: GMAIL all data NW Configure Adaptive Thresholds: GMAIL all data NW

| Metric Name | Threshold Type | Warning Level | Critical Level | Occurrences | Insufficient Data Action |
|---|---|---|---|---|---|
| Database Time (centiseconds per second) | None | | | | |
| Response Time (per transaction) | None | | | | |
| System Response Time (centi-seconds) | None | | | | |
| Executes (per second) | None | | | | |
| Current Logons Count | None | | | | |
| Network Bytes (per second) | None | | | | |
| User Calls (per second) | None | | | | |
| Redo Generated (per second) | None | | | | |
| Physical Writes (per second) | None | | | | |
| Physical Reads (per second) | None | | | | |
| Number of Transactions (per second) | None | | | | |

(Review Statistics)

Edit Baseline Alert Parameters

✎ TIP Select the threshold type and set threshold parameters for the selected metrics:

⊙ Threshold based on: Significance Level —499 ▽    ○ Threshold based on: Percentage of Maximum Warning Level [ High (.95) ]     Warning Level [ ]
   Critical Level [ None ]     Critical Level [ ]
   Occurrences [ High (.95) ]     Occurrences [ ]
          Very High (.99)
          Severe (.999)
          Extreme (.9999)

(Set Thresholds)

Threshold action for insufficen
○ Preserve prior threshold
⊙ Suppress alerts

FIG. 4F

AUTOMATIC DETERMINATION OF HIGH SIGNIFICANCE ALERT THRESHOLDS FOR SYSTEM PERFORMANCE METRICS USING AN EXPONENTIALLY TAILED MODEL

BACKGROUND

Detection and management of performance issues in complex computing systems has traditionally been accomplished by applying thresholds that are fixed, against system-specific metric values that are collected over time. FIG. 1 illustrates a fixed threshold 100 that has been set to value 75 for a metric (e.g. disk reads per second) whose measured value normally varies in a sinusoidal manner depending on the hour of the day, as shown by line 101. Systems using a fixed threshold make simple arithmetic comparison of current metric value against the fixed threshold and alert administrators when the threshold is exceeded (over or under, depending on metric semantics). In the example shown in FIG. 1, such a system generates a false alert at 12 PM when a measurement 102 of the metric is at value 80 even though this value is less than normal (which is shown by line 101) for that hour of the day. The system also fails to generate an alert at 12 AM when the measurement 103 of the metric is at value 70 even though this value is greater than normal.

In addition to missed alerts and false alerts, systems using fixed thresholds for detection of performance anomalies suffer from a number of other shortcomings. In particular such systems are labor-intensive, error-prone, and subjective. Fixed threshold systems are labor-intensive because extensive configuration (and re-configuration) by administrators is often required to be done manually, to initialize and set up the detection mechanisms. Fixed threshold systems are error-prone in that they fail to adjust to expected fluctuations in performance and frequently either fail to signal real problems or signal falsely. Moreover, fixed thresholds are subjective in that every system must be individually configured, often in the absence of accurate historical information, so administrators must make educated (or arbitrary) guesses.

U.S. Pat. No. 6,675,128 granted to Hellerstein on Jan. 6, 2004, entitled "Methods And Apparatus For Performance Management Using Self-Adjusting Model-Based Policies" is incorporated by reference herein in its entirety as background. This patent describes using models of measurement variables to provide self-adjusting policies that reduce the administrative overhead of specifying thresholds and provide a means for pro-active management by automatically constructing warning thresholds based on the probability of an alarm occurring within a time horizon. Hellerstein's method includes components for model construction, threshold construction, policy evaluation, and action taking. Hellerstein's thresholds are computed dynamically, based on historical data, metric models, and separately specified policies for false alarms and warnings. Hellerstein describes an example in which a metric model is used to determine the metric's 95th percentile, for the time interval in which the control policy is being evaluated, which is used as the alarm threshold. Hellerstein does not appear to be interested in using a model to determine very high significance thresholds.

U.S. Pat. No. 6,675,128 does not appear to explicitly describe how a metric model is to be constructed. Hellerstein states that a model constructor 230 is used to estimate the values of unknown constants in models based on historical values of measurement data 215. Hellerstein further states that the operation of component 230 is well understood, as disclosed in the literature on time series forecasting, e.g., G. E. P. Box and G. M. Jenkins, "Time Series Analysis," Prentice Hall, 1977.

SUMMARY

A computer is programmed to fit exponential tail models to upper percentile subsets of observed measurements for performance metrics collected as attributes of a system under observation, such as an email application or a database application. The performance metric can be any metric of such a system that is indicative of the system's performance.

The subsets are defined, from a predetermined percentile range (e.g. 95%–99%), in sets of measurements that are obtained by partitioning a time series to reduce model bias due to expected variations in the observed system's performance, e.g. variations resulting from temporal usage patterns induced by human end users and/or workload scheduling. The time series itself is extracted from measurements being generated by the system under observation, by use of a static or moving time window identified by the administrator as a baseline.

The fitted models obtained from the subsets are extrapolated beyond the upper limit of the predetermined percentile range (e.g. to a percentile greater than 99%) to establish and automatically set warning and alert thresholds to levels of high statistical significance (e.g. 3 nines or 4 nines significance) that inform human administrators when performance anomalies are observed in the performance metrics.

Exclusion of measurements above the upper limit of the predetermined percentile range during subset definition helps eliminate statistical outliers, and therefore makes the fitted model more trustworthy than in the prior art. Moreover, exclusion of measurements below the lower limit of the predetermined percentile range eliminates the need to model the remainder of the probability density function, whose shape may vary depending on the metric. One embodiment characterizes the bulk of the density function using simple computed percentiles (e.g. 25%, 50%, 75%, 90%, 95%.)

Extrapolation of a fitted model beyond the upper limit of the predetermined percentile range eliminates the need to collect and process a large number of measurements that would be otherwise required in the absence of extrapolation to identify values that have the administrator-selected high significance (for use as thresholds).

BRIEF DESCRIPTION OF THE FIGURES

FIG. 2A illustrates a graphical user interface through which a computer programmed in accordance with the invention receives from a human administrator, a periodicity in time that is to be used in partitioning measurements into sets.

FIG. 2B illustrates, in a graph, actual measurements (real data) of a system performance metric (e.g. SQL query executions per second) which exhibits a first pattern across each weekday (e.g. hour of the day), and a second pattern across each week (i.e. weekends decrease significantly as compared to weekdays).

FIGS. 3A–3C illustrate, in flow charts, a method in accordance with the invention that uses an exponential tail to automatically set thresholds for system performance metrics.

FIG. 4F illustrates a graphical user interface through which a computer programmed in accordance with the invention receives from a user a significance level for use in setting a threshold.

DETAILED DESCRIPTION

Figure 1:
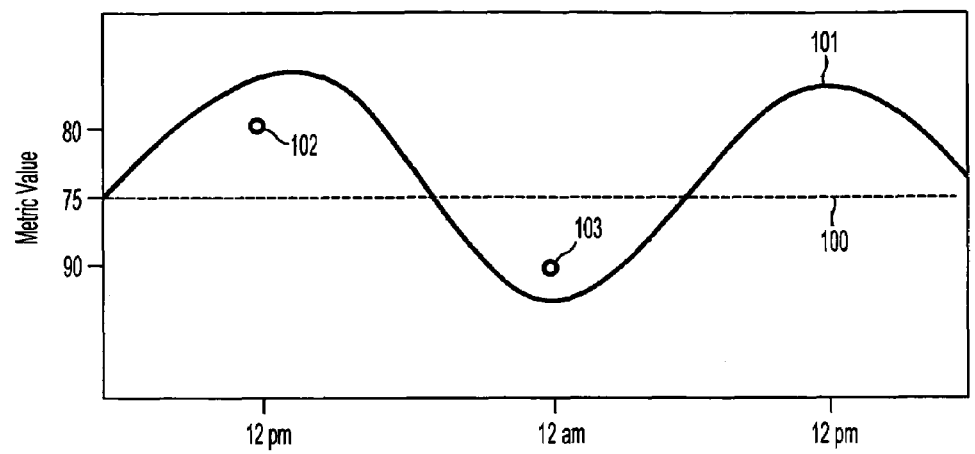
FIG. 1 illustrates, in a graph, use of a fixed threshold by a prior art computer system that generates false alerts, as well as fails to generate alerts when appropriate.

A computer 250 (FIG. 2A) is programmed, in some embodiments of the invention, to use measurements of a performance metric of a system, to set thresholds for alerting an administrator (e.g. human) at one or more levels (such as alerts and warnings). The measurements are typically numeric values collected and/or computed at regular time intervals and can thus be thought of as a time series. The measurements are generated by the system under observation asynchronously relative to the methods of setting thresholds and alarming that are performed in computer 250, i.e. to use the measurements. Depending on the embodiment, the system under observation may be either internal to or external to computer 250.

Such a time series M is expressed as a set of 3-tuples composed of an identifier, a timestamp and a metric value as follows:

$$M1 = \{<id1, t1, v1>, <id1, t2, v2>, \ldots, <id1, tn, vn>\}$$

(wherein first tuple includes: id1 which uniquely identifies the specific system (such as a specific database) and the specific metric, t1 which represents a specific timestamp and v1 which represents a specific value of the metric). Note that the term "data source identifier" as used herein refers to a single identifier that uniquely identifies each of a specific system (e.g. a database server or an email server) and a specific metric (e.g. SQL executions per second or email messages sent per minute). The above definition of time series M can be extended to include multivariate time series; that is a vector of metric values sharing a common timestamp having been measured simultaneously.

A tuple of a measurement as described above can contain other types of members, e.g. instead of (or in addition to) the timestamp, a member called "Workload Type" is used in an alternative embodiment of the tuple. This alternative embodiment uses measurements that identify the numeric value "v" in addition to the indicator of the kind of work the system was doing at that time, e.g. "OLTP", "Batch" and "Idle". In yet another alternative embodiment, the measurements themselves do not identify the type of work (e.g. the tuple could be same as in the previous paragraph), but instead computer 250 is programmed to identify which workload type is associated with each measurement, based on in which time period the measurement's time falls during which the system under observation was in a given workload state.

In some embodiments, all measurements are stored in computer 250 in a single table in a relational database, and each of "id", "t" and "v" is a column in this table. Note that a single identifier "id" is not used in other embodiments (which use a combination of multiple identifiers, such as a column that identifies an ORACLE database and another column that identifies a specific RAC instance of the ORACLE database). Note that the source identifier "id1" has the same value in all the measurements listed above for metric M1, because it is the identifier of metric M1. For a different metric, the source identifier is different.

There are a number of sources for such time series in computer 250 that is programmed with software for the ORACLE Database, version 10 g available from Oracle Corporation, such as (1) V$SYSMETRIC virtual table (2) DBA_HIST_SYSMETRIC_HISTORY view both of which are available in the Server, and (3) MGMT_METRICS_RAW table available in Enterprise Manager ("EM") Repository. In alternative embodiments, the metric time series is actually a time series of statistical aggregates from a raw data time series. Examples of aggregate time series that are used in a few embodiments are (1) DBA_HIST_ SYSMETRIC_SUMMARY in the Server, which is a snapshot-level aggregation of V$SYSMETRIC and (2) MGMT_ METRICS_1 HOUR in Enterprise Manager Repository, which is an hourly aggregation of MGMT_METRICS_ RAW.

In one embodiment, metrics for which thresholds are computed and set are as follows.

| Metric ID | |
|---|---|
| | Performance Metrics |
| 2106 | SQL Service Response Time |
| 2109 | Response Time Per Txn |
| 2123 | Database Time Per Sec |
| | Workload Volume Metrics |
| 2003 | User Transaction Per Sec |
| 2004 | Physical Reads Per Sec |
| 2006 | Physical Writes Per Sec |
| 2016 | Redo Generated Per Sec |
| 2026 | User Calls Per Sec |
| 2058 | Network Traffic Volume Per Sec |
| 2103 | Current Logons Count |
| 2121 | Executions Per Sec |
| | Workload Type Metrics |
| 2031 | Logical Reads Per Txn |
| 2045 | Total Parse Count Per Txn |
| 2066 | Enqueue Requests Per Txn |
| 2072 | DB Block Changes Per Txn |

In another embodiment, thresholds are set for the following metrics in the manner described herein.

| Metric ID | Metric Name |
| --- | --- |
| 2000 | Buffer Cache Hit Ratio |
| 2003 | User Transaction Per Sec |
| 2004 | Physical Reads Per Sec |
| 2006 | Physical Writes Per Sec |
| 2017 | Redo Generated Per Txn |
| 2018 | Logons Per Sec |
| 2019 | Logons Per Txn |
| 2022 | User Commits Per Sec |
| 2025 | User Rollbacks Percentage |
| 2026 | User Calls Per Sec |
| 2027 | User Calls Per Txn |
| 2031 | Logical Reads Per Txn |
| 2034 | Redo Writes Per Sec |
| 2044 | Total Parse Count Per Sec |
| 2045 | Total Parse Count Per Txn |
| 2050 | Cursor Cache Hit Ratio |
| 2054 | Execute Without Parse Ratio |
| 2057 | Host CPU Utilization (%) |
| 2058 | Network Traffic Volume Per Sec |
| 2066 | Enqueue Requests Per Txn |
| 2072 | DB Block Changes Per Txn |
| 2075 | CPU Usage Per Sec |
| 2076 | CPU Usage Per Txn |
| 2103 | Current Logons Count |
| 2106 | SQL Service Response Time |
| 2107 | Database Wait Time Ratio |
| 2108 | Database CPU Time Ratio |
| 2109 | Response Time Per Txn |
| 2120 | Executions Per Txn |
| 2121 | Executions Per Sec |
| 2123 | Database Time Per Sec |

Some data sources (such as a database or other system) produce a measurement's time series over intervals and thus with two timestamps (a "begin time" and "end time"). In this case the two timestamps are converted by computer 250 into a single timestamp using a midpoint between them. The use of midpoint timestamps in some embodiments is based on the assumption that interval-based time series from a common data source will have equal-sized intervals. When this is not the case, then weighted computations using interval size as the weighting factor are used (in other embodiments) to generate the single timestamp. Still other embodiments use the end time as the representative time stamp for the interval.

Computer 250 is programmed in several embodiments to extract certain of the above-described measurements (see act 301 in FIG. 3A) based on a "window" of time. The window is specified by an administrator, e.g. "trailing 21 days" through a field 252 (see FIG. 2A) in a graphical user interface in some embodiments of computer 250. The administrator-specified window is used by computer 250 in forming sets of measurements (by partitioning as discussed below) from the administrator-specified time period which is called a "baseline" period. A baseline period B is a period of time over which the behavior of one or more metrics is used for threshold generation as described herein for some embodiments. Specifically, computer 250 is programmed to compare thresholds that are computed from measurements over the baseline period, to measurements observed at a future time. The baseline period is a non-empty period of time expressed as disjoint collection of any number of time intervals:

$$B=\{[t_1,t_2), [t_3,t_4), [t_{2n-1},t_{2n})\}$$

where $t_j \leq t_{j+1}$ and $[t_j,t_{j+1}) \cap [t_k,t_{k+1}) = \phi$ if $j \neq k$ (i.e. non-overlapping)

In the above definition for B, the multiple time intervals are expressed as half-closed to ensure that any given timestamp can belong to at most one of the member intervals of a baseline period. Note that any collection of overlapping time intervals can be reconstructed into an equivalent baseline period by merging overlapping intervals. In one embodiment the baseline period consists of a single time interval (such as "trailing 21 days").

Note that computer 250, when configured by administrator to use a moving window baseline adapts thresholds to slowly evolving systems (e.g. if 10 email users are being added every month), by computing thresholds using measurements from a window of a fixed length that moves over time, wherein measurements from only the last N days (relative to today) are available for partitioning (N is illustrated in field 252 in FIG. 2A as being 21 days). Such a moving window baseline period is automatically and regularly computed by computer 250, based on the window length specified in the user input in field 252. Use of moving window baseline periods has the advantage that system evolution over time is automatically incorporated into baseline characterization.

A static baseline period is an ad hoc collection of non-overlapping time intervals provided by the user (i.e. administrator). As an example, a static baseline may be selected from a drop-down list by an administrator by clicking one of the predetermined baselines in field 253 in FIG. 2A, the period between Thanksgiving and Christmas of a particular year (e.g. 2003), which is of particular relevance to e-commerce businesses. A static baseline may be predetermined using knowledge outside the scope of the computer system but with clear meaning for the user (i.e. the human administrator), by clicking on link 254 (labeled "Manage Static Metric Baselines") which opens a new screen for input therein. An example of such knowledge is a company's Month End Inventory period, which is a 20-hour period occurring sometime in the last weekend of the month depending on the level of business during the month. Static baseline periods are useful when there is a known time period that is desirable for use as a basis for comparison.

Measurements from a metric's time series M are extracted by computer 250, from measurements being generated by the system under observation, if their timestamps fall within one of the time intervals in the administrator-selected baseline B. The just-described intersection between the time series M and baseline period B, yields a baselined time series characterized as follows (assuming a 2-tuple representation of each measurement):

$$M \circ B = \{<t_m, v_m>\} \text{ where } <t_m, v_m> \in M \text{ and } t_j \leq t_m$$
$$<t_{j-)} \in B$$

Hence, a computer of several embodiments is programmed to form a baselined time series for a metric M and baseline B by identifying all 2-tuple s in M whose timestamps lie within one of the time intervals in B.

In one embodiment, a baselined time series is extracted by intersecting time intervals of baseline B with a persisted store of historical measurements of metric M in a SQL relational table. Other embodiments extract data from in-memory sources and/or non-relational formats (e.g. XML). The historical measurement data is characterized in one illustrative embodiment as in a type declaration for [raw measurement data] in Appendix A. This illustrative embodiment instantiates such an historical measurement data store as a simple relational table with one column for each attribute of [raw measurement data]. This embodiment makes use of an abstract characterization of an interval of time, for example as in the type declaration for [time_interval] in Appendix A. Hence, this illustrative embodiment implements relational tables based on the type definitions of Appendix A over which SQL queries of the type outlined in Appendix A are executed to obtain the result sets containing measurement data as intersected with the time intervals, i.e. the baselined time series for this embodiment. Hence, measurement data is extracted in this embodiment only if the measurement's timestamp lies within one of the time intervals of baseline B.

Computer 250 is further programmed to map any measurement of a baselined time series into one of a fixed "set" of values, to implement partitioning (e.g. based on time or events) as follows:

$$f{:}t_m \to P \text{ where } \{<t_m, v_m>\} \in M \circ B$$

A number of partitions P are therefore generated from the baselined time series (in acts 302A–302A that are performed in parallel in some embodiments for the respective metrics A-Z), to allow a human administrator (i.e. user) to slice and dice a dataset of the baselined time series, e.g. in a manner similar to the GROUP BY construct in SQL. One example of partitioning functions is hour-of-the-day partition which may be specified in a field 251 in FIG. 2A. This function "f" maps any timestamp into an integer between 0 and 23. Similarly, the function day-of-the-week maps any timestamp to the strings "Monday" . . . "Sunday". Note that the product of two partitioning functions is itself a partitioning function. Hence, the function Same hour and day is simply the product of Same hour of the day and Same day of the week. Such partition functions are used by computer 250 to extract measurements of a "set" (over which threshold values are computed) from both static baselines and moving window baselines according to a temporal partitioning scheme specified by the user.

Hence, computer 250 automatically partitions all available measurements of a system performance metric (such as disk reads per second) into a number of sets, based on a predetermined scheme for partitioning the measurements, e.g. based on the time of observation (also called "time partitioning"). Depending on the embodiment, a partitioning scheme may be hard-coded into computer 250, or supplied by a human (as described in reference to FIG. 2A). Hence, such embodiments estimate and apply different thresholds for different sets. New measurements are compared (by a computer in which the thresholds are set which may or may not be same as the computer that sets the thresholds) to thresholds that are estimated from respective sets into which the new measurements would belong, based on timestamps of the new measurements.

For example, if a metric normally varies sinusoidally over 24 hours as illustrated in FIG. 1, and if the time partitioning is operator-selected to be made by the hour of the day, then the computer automatically selects measurements made during a given hour of each day, across several days, to form one "set." For example, measurements on each day of the week, Monday-Friday which are made during the lunch hour in the respective days are automatically selected by computer 250, to form one set. Moreover, measurements made during the midnight hour in the same five days are automatically selected by computer 250 to form another set. In this manner, when the time partitioning is by the hour of the day, a total of twenty-four sets are formed by the computer of such embodiments (because there are 24 hours in a day), and each set contains measurements that are made over a number of days. Note that in order to partition measurements into their respective "sets," it is necessary to know a timestamp at which each measurement was made (for time-based partitioning).

Instead of partitioning a baselined time series into sets using a time-based partitioning scheme, other embodiments may use event-based partitioning schemes (such as when a batch job starts and when the batch job ends). Also, the above-described hour of the day partitioning scheme does not take into account variability in measurements at a larger scale, e.g. measurements during weekdays being higher than measurements during weekends, as illustrated in FIG. 2B. A time partitioning by the hour of the day over weekdays and weekends accounts for such variability, but requires partitioning the available measurements into a total of 48 sets as follows: 24 sets containing measurements in the weekdays and another 24 sets containing measurements in the weekends.

Another time partitioning scheme, for systems whose performance is strongly correlated with employees' work hours, apportions all measurements into just two sets, one set containing measurements during the day (e.g. 8 AM to 8 PM) and another set containing measurements during the night (e.g. 8 PM to 8 AM). The larger scale variability is accounted for if the time partitioning is done by, day and night over weekdays and weekends, which requires a total of 4 sets. Yet another time partitioning, for metrics that are strongly correlated to the different days in a week, is by the day of the week, wherein a total of 7 sets are formed. If partitioning by day and night, per day of the week a total of 14 sets are formed.

Note that time partitions that are used in some embodiments are defined by the periodicity of usage of the systems by humans and/or by scheduled jobs. For example, the weekday and weekend partition based on human usage may be implemented in such embodiments as having 5 workweek days and 2 weekend days for normal weeks in the year, and only 4 workweek days and 3 weekend days in weeks that have a long weekend, such as the Memorial Day weekend. Similarly, the day and night partition of some embodiments implements changes made to clocks on account of day light savings. As another example, jobs are also scheduled at periodic intervals, such as every Monday regardless of whether the Monday is a work day or a holiday in a long weekend.

Some embodiments may impose a time partition scheme on a time series of measurements using a computer program function as follows. Specifically, a function "TimeGroup" receives as input variables "date-time" and "time-partitionining-scheme" and returns as output a classification of "time-group" of the input "date-time" according to the input "time-partitioning scheme". Some embodiments call such a function in the context of SQL queries that sample raw time series data to group time series observations for purposes of statistical calculations, e.g. using the SQL GROUP BY clause. Such functions are used as partitioning functions (for example time based or event based) in some embodiments.

One illustrative embodiment partitions the baselined time series by a combination of a human operator's selection for a day grouping and a week grouping, using a scheme that concatenates string tokens representing a day code for the input date-time variable, with string tokens representing a week code for the input date-time variable. Hence, one embodiment supports the following nine schemes for time-based partitioning of the baselined time series:

|      | DAY |    |    |
| WEEK | H   | N  | X  |
|------|-----|----|----|
| D    | HD  | ND | XD |
| W    | HW  | NW | XW |
| X    | HX  | NX | XX |

In the above table, daily scheme code values are shown in columns, selected from the set {'H', 'N', and 'X' }, where: 'H' means group by hour of day, assign a different code for each hour; 'N' means group day hours together and night hours together; and 'X' means group times together. Moreover, weekly scheme code values are shown in rows, selected from the set {'D', 'W', and 'X' }; where: 'D' means group times by day of week; 'W' means group weekdays together and weekends together; and 'X' means group all times from all days of week together. One such embodiment allows the operator to select only those schemes from the above table, for which there may be sufficient data in the baselined time series.

Computer 250 when executing the function "TimeGroup" takes as input a timestamp (including the date), and the operator-selected daily grouping and hourly grouping (which may be input as two separate tokens or as a single token depending on the embodiment), and returns an identifier of a "set" to which this input timestamp belongs. In this sentence, the word "token" represents a string or a number (or any other data type) that encodes the partitioning scheme. Hence, inputs to this Function "TimeGroup" are:

> Date-time input variable=timestamp, e.g. from measurement timestamps Time partitioning input variable=daily scheme code+weekly scheme code Hence, the output of this Function "TimeGroup" is:

> Output variable=daily group code string+':'+weekly group code string

Daily group code string values used in one embodiment are: (1) '00'–'23' representing the hour of day of the date input variable if the daily scheme code is 'H'; (2) 'DY' representing the daytime group if the date input variable timestamp is between 7 am and 6:59 pm and the daily scheme code is 'N'; (3) 'NT' representing the nighttime group if the date input variable timestamp is between 7 pm and 6:59 am and the daily scheme code is 'N'; and (4) 'XX' when the daily scheme code is 'X'

In one embodiment the hourly group code string is obtained using a specific format mask with the Oracle TO_CHAR function:

> Hour code = string representation of:
> TO_CHAR(date-time input variable, 'HH24')

Weekly group code string values used in one embodiment are: (1) '00'–'06' representing an encoding of the day of the week for the date input variable timestamp when the weekly scheme code is 'D'; (2) 'WE' representing a weekend group when the date input variable timestamp is between 12:00 am Saturday and 11:59 pm Sunday and the weekly scheme code is 'W'; (3) 'WD' representing a weekday group when the date input variable timestamp is between 12:00 am Monday and 11:59 pm Friday and the weekly scheme code is 'W'; and (4) 'XX' for all values of the date input variable timestamp when the weekly scheme code is 'X'.

In one embodiment the weekly group code string is obtained using a specific format mask with the Oracle TO_CHAR date function:

> Day of week code = string representation of:
> TO_CHAR(date-time input variable, 'D')

Note that such a day of the week code is normalized in one embodiment, to account for differences in day of week numbering in different countries of the world (e.g. the $1^{st}$ day of the week in the US is Sunday but in Great Britain is Monday).

In an example under this coding scheme the input variable value 'HX' indicates that the times should be partitioned so as to group together time stamps with the same hour of day and not to make any group separation based on the day of the week. There are 24 possible encodings for this scheme, for example as may be represented by the following set of 5-character strings:

> {
> '00:XX', '01:XX', '02:XX', '03:XX', '04:XX', '05:XX', '06:XX',
> '07:XX', '08:XX', '09:XX', '10:XX', '11:XX', '12:XX', '13:XX',
> '14:XX', '15:XX', '16:XX', '17:XX', '18:XX', '19:XX', '20:XX',
> '21:XX', '22:XX', '23:XX'
> }

Similarly for the coding scheme input variable 'XD' there are seven possible 5-character time group codes returned:

> {
> 'XX:00', 'XX:01', 'XX:02', 'XX:03', 'XX:04', 'XX:05', 'XX:06'
> }

Figure 3B:
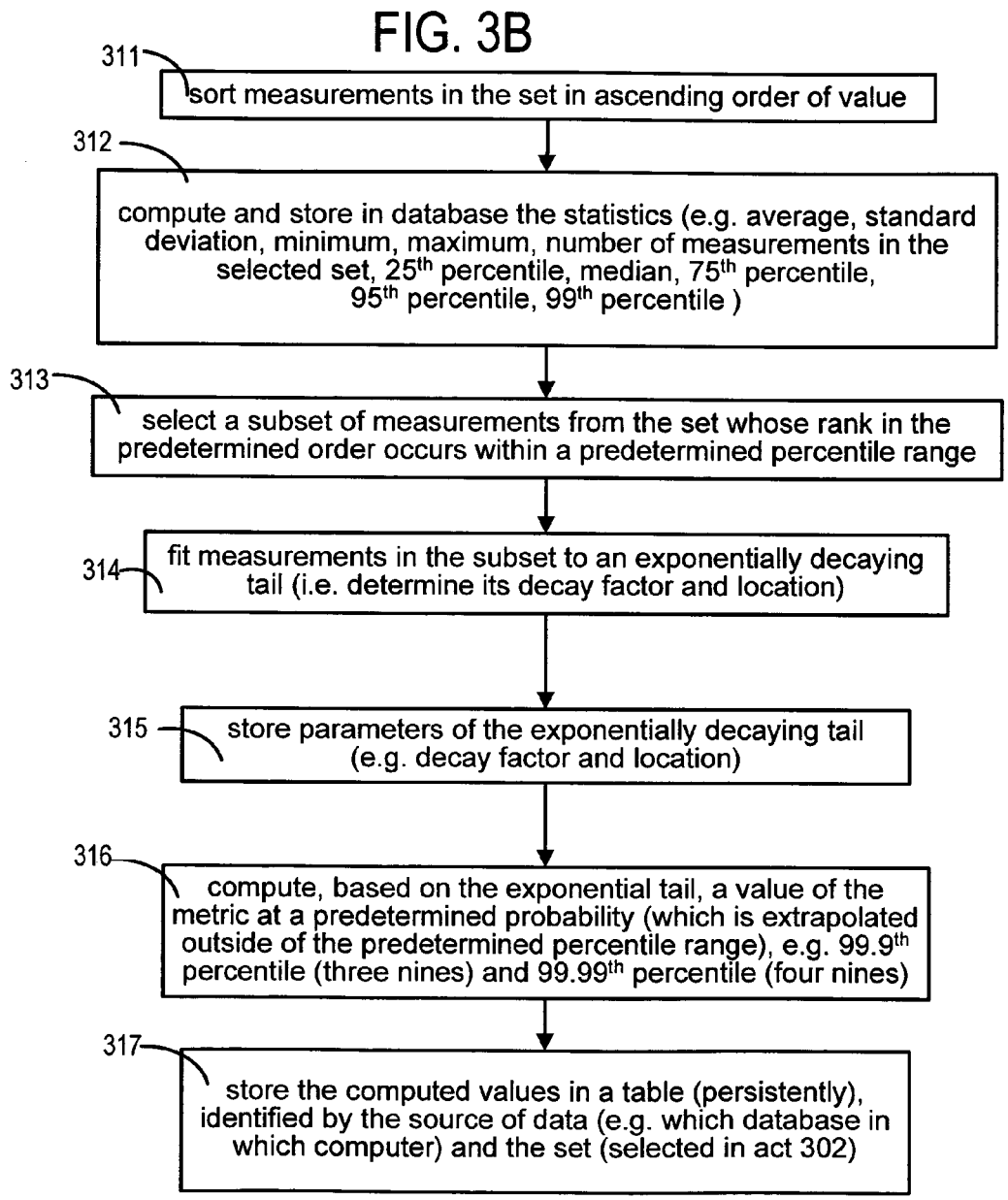

After such partitioning, the measurements in each set are used to compute basic percentiles and optionally other statistics such as mean and standard deviation for each metric A-Z (see acts 303A–303Z in FIG. 3A). Specifically, the measurements are initially sorted in the ascending order of their value (although the descending order may be used in other embodiments), as per act 311 in FIG. 3B. Any sorting method known in the art may be used. In some embodiments, a sorting method built into the database ORACLE 10 g available from Oracle Corporation is used. The sorted measurements are illustrated by an idealized plot 401 in FIG. 4A the probability density (along the y axis) of the measurements, as a function of the value of the measurements (along the x axis).

Then, one or more statistics and percentiles (such as minimum, maximum, average, standard deviation, $25^{th}$ percentile, median, $75^{th}$ percentile, $95^{th}$ percentile and $99^{th}$ percentile) are computed and stored persistently in a database, in some embodiments (see act 312 in FIG. 3B). Such a computation includes identification of the upper and lower limits of a predetermined percentile range (e.g. 95% and 99%), simply by inspection of the sorted measurements. Specifically, if "n" is the total number of measurements in a set, then 0.95 n (rounded to higher whole number) identifies the rank of the measurement for which the value is at the 95$^{th}$ percentile.

Figure 4A:
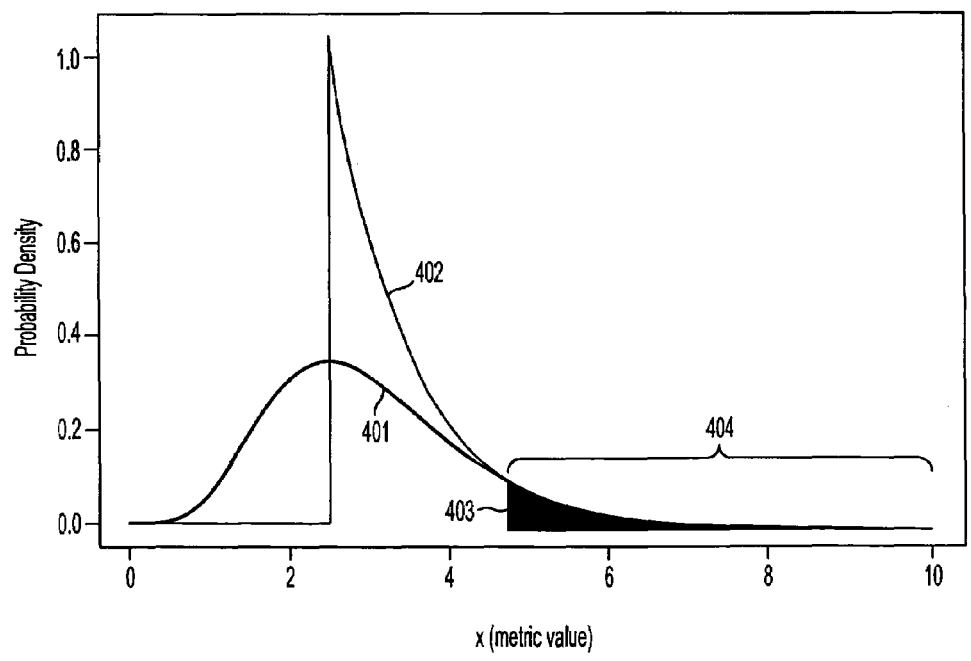
FIG. 4A represents fitting, in accordance with the invention, of an exponential decay function 402 to the tail portion 401 of an idealized distribution of measurements.

Next, a subset of measurements 412 (FIG. 4B) that happen to fall in the predetermined percentile range are thereafter selected (in act 313 in FIG. 3B), for use in curve fitting only a tail 404 (of curve 401; see FIG. 4A). A "tail" of a distribution conventionally refers to the extreme regions of the distribution—both left and right. However, most embodiments of the invention use only the right tail (i.e. at the high end of the metric) of an exponential distribution which is defined by the following function (which is valid only for $x \geq 0$ and is at value 0 for $x<0$):

$$f(x)=\lambda e^{-\lambda x}.$$

A cumulative function F for the function f in the above equation is as follows (which is valid only for $x \geq 0$ and is at value 0 for $x<0$):

$$F(x)=1-e^{-\lambda x}.$$

Note that alternative embodiments may use any long-tailed probability density function f(x) that is bounded by two exponentially decaying functions as follows:

$$ae^{-ax} \leq f(x) \leq be^{-bx}$$

wherein there exists some $x_0$ for which this inequality holds for all $x > x_0$.

Regardless of which function is used to model a tail, several embodiments eliminate the need (during curve fitting) to model the remainder of the probability density function (i.e. outside of tail 404). Specifically, a remainder that is below the predetermined percentile range is different for each of the following distributions: Exponential Distribution, Weibull Distribution, Lognormal Distribution, and Gamma Distribution. An engineering approximation is made as illustrated by the example shown in FIG. 4B. Specifically, a bottom end of a percentile range, which is used to identify a subset of measurements, is predetermined to be sufficiently high, e.g. 95%. Hence, measurements 411 (FIG. 4B) whose values are within the bottom 95% in the set are excluded from the subset to be used for curve fitting. In an example with one thousand measurements in a set, the bottom nine hundred fifty measurements are excluded.

Figure 4B:
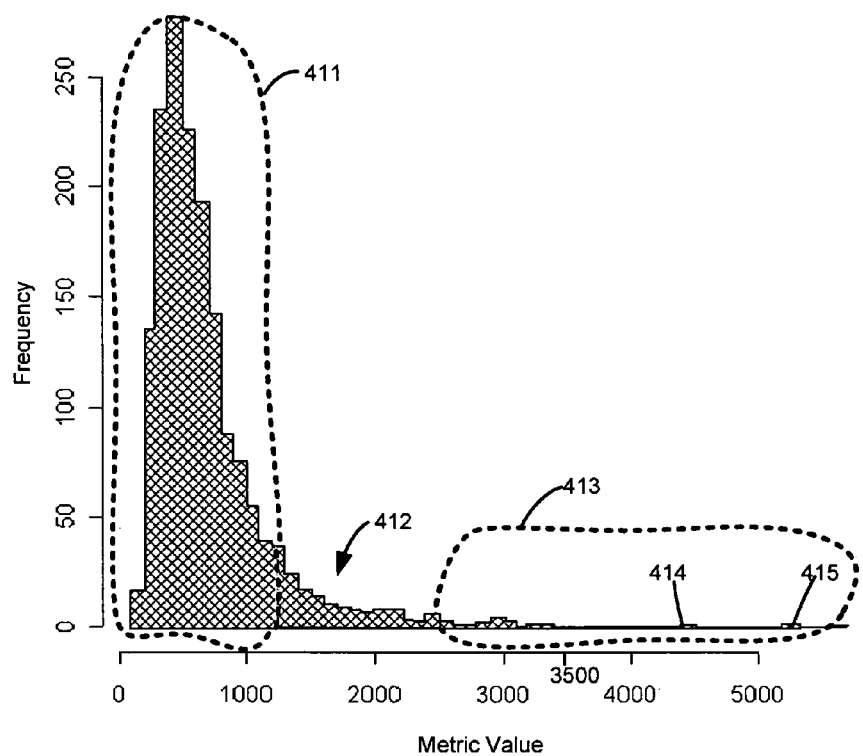
FIG. 4B illustrates, in a graph, multiple measurements of a system performance metric, from which measurements 402 that found to be in a predetermined percentile range are selected for use in curve fitting.

Moreover, in the example of FIG. 4B, a top end of the percentile range is selected to be 99%, which means that measurements 413 whose values are within the top 1% in the set (also called "outliers") are excluded from the subset. In the example of 1000 measurements, the top 10 measurements (i.e. up to 10 outliers) are excluded. Therefore, the subset contains the remaining measurements 412, which are forty in number. Note that 1020 measurements per partition are accumulated in 17 days, if a measurement is made once a minute (60 measurements/hour), and if the baselined time series is partitioned by the hour of the day.

Figure 4C:
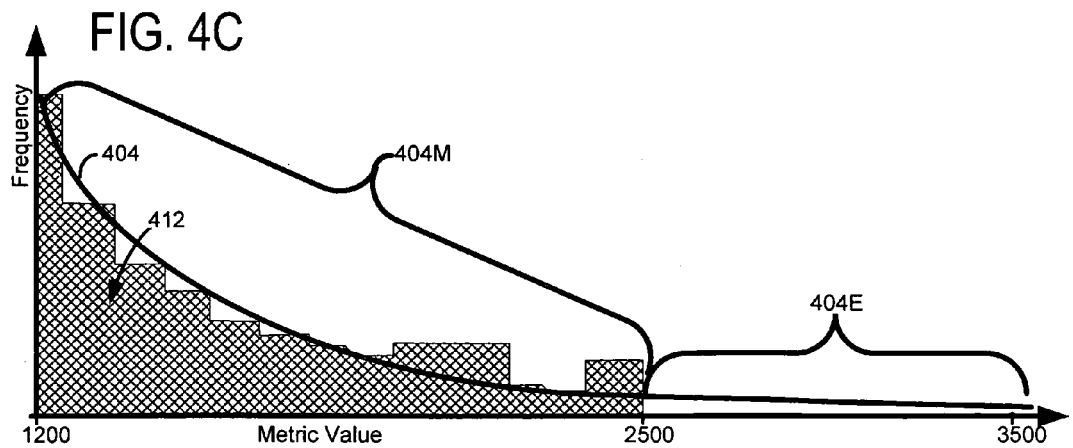
FIG. 4C illustrates, in a graph, a fitted portion 411 and an extrapolated portion 412 of an exponential tail 410 that models the subset of measurements 402.

Hence, a top end (e.g. 99%) of a percentile range to be used in curve fitting (a top end of tail portion 404M; e.g. at 2500 in FIG. 4C) is predetermined to minimize the potential for inclusion of statistical outliers (i.e. abnormal values) in measurements to which a curve is to be fitted, increasing the accuracy of the estimate. A bottom end (e.g. 95%) of the percentile range is predetermined to exclude a large number of (more than a majority of) measurements whose use would require curve fitting of a complete probability distribution function (which may be arbitrarily complex depending on the metric, and not necessarily exponential).

In using only a predetermined percentile range of measurements, a large number of measurements remain unused, and moreover the number of measurements used becomes small. For example, if a measurement is generated once every 5 minutes, then there are 12 measurements in each hour, and 85 days are required to accumulate 1020 measurements. For such a metric, a lower bottom end (e.g. 85%) is used in some embodiments for the predetermined percentile range, to increase the number of measurements in the predetermined percentile range which in turn reduces the size of the set. In an alternative embodiment, a coarser time partitioning is used, e.g. group by day-night, there are only two sets and 1000 measurements are accumulated in a week (for 5 minute interval measurements). Pseudocode for selecting a subset of measurements, for use in curve fitting, is illustrated in Appendix B.

After identifying measurements in the subset, computer 250 automatically fits a curve of a predetermined shape to these measurements (see act 314 in FIG. 3B), and thereafter stores persistently in a database, the parameters obtained from curve fitting (see act 315 in FIG. 3B). The inventors note that many computing system performance metrics exhibit an exponential distribution which has an exponentially decaying tail, and even if exhibiting a non-exponential statistical distribution nonetheless have a region that can be modeled by (or approximated by) an exponentially decaying tail.

Hence, as discussed below, an exponentially decaying tail is fitted in many embodiments, to which one or more of the following apply: a) performance issues in otherwise stable systems are unusual, and occur with unexpected frequency; b) performance issues in otherwise stable systems are associated with unusual observations in system performance metrics; c) measurements of system performance metrics, either in raw form or through a transform, have ranges with one-sided tails, e.g. ranging from zero to a large unknown maximum value; d) stable systems often exhibit significant yet expected variations in performance over predictable time periods (e.g. between online and batch processing cycles); e) stable systems evolve over time and this evolution is reflected as changes to expected distributions of measurements of system performance metrics.

In several embodiments, the curve being fitted models a portion 404M (FIG. 4C) of exponentially decaying tail 404. As discussed later, another portion 404E (FIG. 4C) of this same tail 404 which is obtained by extrapolation is used to identify thresholds in accordance with the invention. Fitting of measurements to such a model (per act 314 in FIG. 3B) involves determining two parameters namely a decay factor of tail 404 and a location of the tail 404.

Figure 4D:
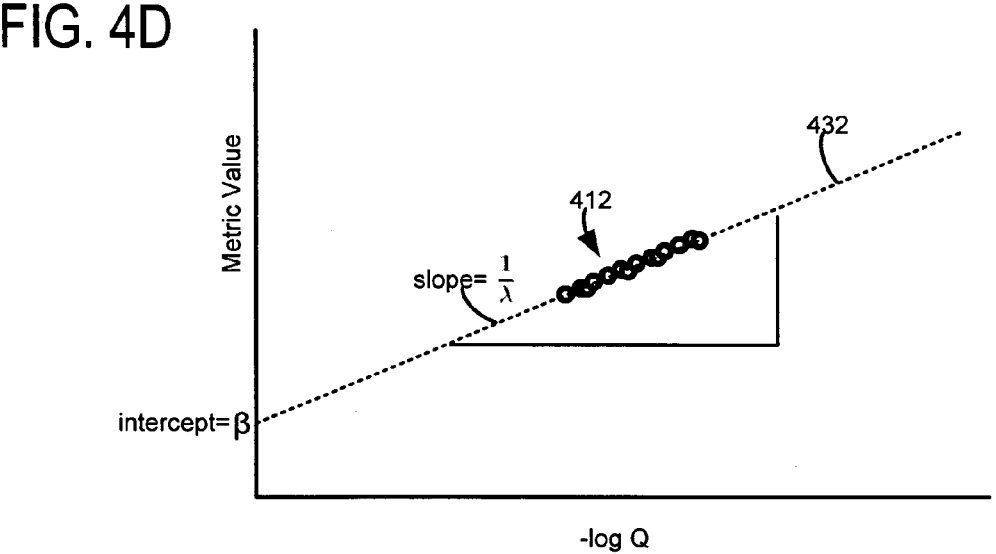
FIG. 4D illustrates, in a graph, with -logQ (wherein Q is [100-percentile]/100) on the x axis, and the measurements (of a system performance metric) on the y axis, the concept of fitting a straight line 422 to the measurements 421, to determine two parameters (slope and intercept) of an exponential tail model.

As tail 404 decays exponentially, such fitting may be conceptually understood as follows: generate Q=1-percentile for each of measurements 412 in the selected subset, convert Q into the logarithmic domain, and fit the −log Q of measurements 412 to a straight line 432 (FIG. 4D). Since a straight line 432 is represented by two unknowns, namely slope $1/\lambda$ and intercept $\beta$, one may solve for these two unknowns by use of any two of the converted measurements 412.

Figure 4E:
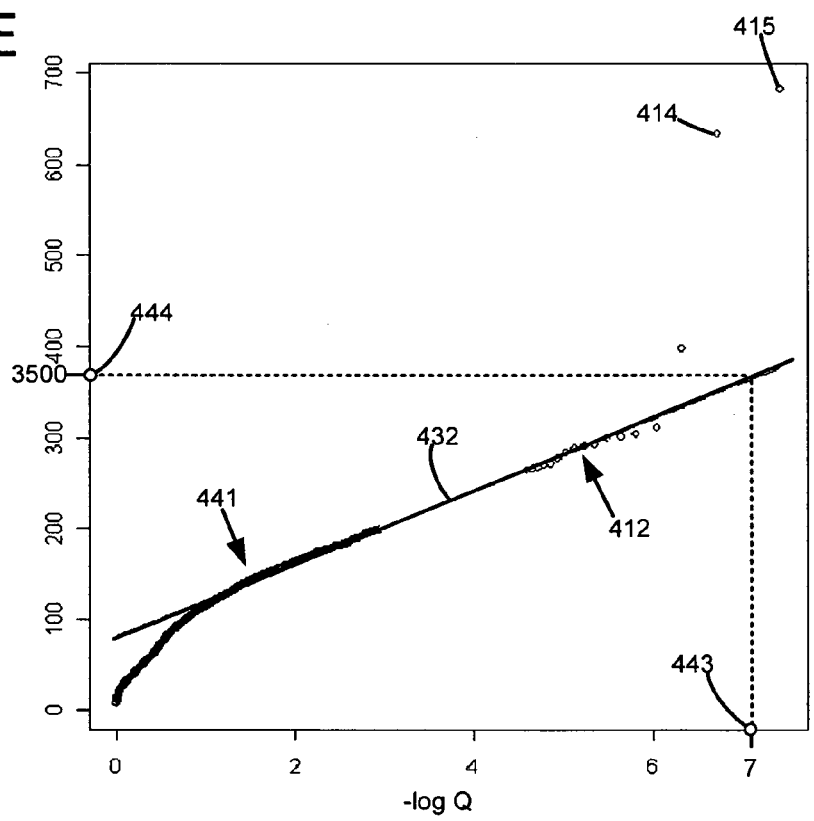
FIG. 4E illustrates, in a graph, how a fitted portion of the exponential tail, when extrapolated, identifies a value 434 that corresponds to an administrator-selected significance 433, for use as a threshold.

The two parameters that identify an exponentially decaying tail 404 (FIG. 4C) can be computed in computer 250 in any manner well known in the art, e.g. by use of a least squares method as described next. In some embodiments, an ordinary least squares regression fit is performed in a graph of measurement $x_k$ along the ordinate versus −log (Q), along the abscissa as shown in FIGS. 4D and 4E, wherein Q=(1−k/n), to provide the two parameters of the fitted tail, namely (A) a point at the smallest measurement in the subset $x_m$ and (B) the slope of a line passing through this point. As noted above, the highest values of measurement X (e.g. in the top 1%) in each set were excluded from the subset since these may be due to unusual events (i.e. statistical outliers). Moreover, a majority of the values of measurement X that comprise the remainder of the distribution of measurements are also excluded, e.g. below 95%. Thus, fitting of $-\log(1-k/n)$ along the abscissa, versus $x_k$ along the ordinate, is performed within the range $m \leq k \leq l$, wherein $m \leq l \leq n$.

$x_k$—k is the rank of measurement x when sorted in ascending order

X—measurement n—highest rank (total number of measurements in a set)

m—value of k where the tail's fitting starts, 0.95*n (in this example)

l—value of k where the tail's fitting ends, 0.99*n

Note that the above-described curve fitting method using least squares has certain problems. First, the log-linear relationship is based on an asymptotic approximation and is only valid for large n. A more serious problem is that basic linear regression theory assumes that the abscissa values being fitted are independent. This is not the case for many metrics, because the $x_k$ are correlated. To remedy this problem, the following formulae are programmed into computer 250 of some embodiments, to yield estimates of (B) the slope $1/\lambda$ (also referred to as µ) of the fitted line, and (A) the point as determined by $\log(1-m/n)$ on the abscissa and β on the ordinate (through which point the line passes):

$$\hat{\beta} = x_m \quad (1)$$

$$\mu = \frac{1}{\hat{\lambda}} = \left( \sum_{k=m}^{l} x_k + (n-l)x_l - (n-m+1)x_m \right) \quad (2)$$

$$\mu_1 = \left( \sum_{k=m}^{j} x_k + (n-j)x_j - (n-m+1)x_m \right) \quad (3)$$

$$\left| \frac{\hat{\mu}_1}{\hat{\mu}} - 1 \right| > \frac{2}{\sqrt{l-m}} \quad (4)$$

Note that equations 3 and 4 are described below in reference to goodness of fit.

Several embodiments compute the above-listed model parameters in equations (1) and (2) from the above-described subset of measurements in the predetermined percentile range, as illustrated in the pseudo-code in Appendix B below, that is incorporated by reference herein in its entirety. As shown in Appendix B, such embodiments implement a function "exponential_tail_statistics" to compute statistics using as input a variable of type "observation set" and returning as output variable of type "statistics set." Specifically, one embodiment uses a nested table of Oracle objects as the input type, as illustrated by the type definitions in Appendix B.

Such a function is essentially a transform of a set of raw data measurements (in one embodiment having an embedded time partitioning group code) into a set of statistics computed over the time groups identified by code values. One embodiment accomplishes this transformation in a single SQL SELECT statement organized with the following pseudo-code structure, where the quantities being computed are expressions derived from the equations (1) and (2) above, and the Goodness of Fit Formula from inequality (4) above.

For purposes of illustrating the efficacy of the invention, the measurements 411 (FIG. 4B) which were excluded from curve fitting are converted into the logarithmic domain and shown in FIG. 4E as the respective converted measurements 441. As can be seen from FIG. 4E, straight line 432 obtained by curve fitting as described in reference to FIG. 4D provides a good fit for many measurements even outside of the subset of selected measurements used in curve fitting. Hence, line 432 is used to identify one or more thresholds as discussed next.

A fitted curve (exemplified by line 432 in FIG. 4E) is used in many embodiments as the basis for establishing statistically significant percentile values by extrapolation (see act 316 in FIG. 3B), such as the value of the metric at 3 nines and at 4 nines significance. For example, in some embodiments computer 250 elicits from the user, through a field 499 (FIG. 4F) of a graphical user interface, a significance level to be used in setting a threshold. Thereafter, computer 250 transforms this significance level into the metric's value, using the fitted curve. Conceptually, by going to the logarithmic domain, one can take a measurement's log to yield a value 443 and apply value 443 at point 6.91 on the x axis in FIG. 4D to identify a corresponding value 444 at point 3500 on the y axis which is the percentile value. Computer 250 of many embodiments uses the above-described equations (1) and (2) to compute the two unknown parameters of the fitted curve namely slope $1/\lambda$ and intercept β (also called "model parameters").

Value 444 that is obtained from using line 432 is thereafter stored by computer 250 (as per act 317 in FIG. 3B) as a threshold for use in notifying a human operator. Next, computer 250 checks if all sets obtained by time partitioning in act 301 have been processed in the above-described manner. If not, then control transfers to act 302. If all sets have been processed in this manner, then the computer 250 waits (as per act 305) for a predetermined duration between intervals (over which the measurements in a set are accumulated), followed by returning to act 301. The predetermined duration is selected to ensure that at least one new measurement has been added to each set. In the above-described example of time partitioning by the hour of the day, the computer waits for a day (24 hours), because there are 24 sets.

In the example illustrated in FIG. 4E, a significance level of 0.999 (1 in 1000, or 3 nines) has the logarithmic value approximately 6.91 (i.e. value 443), which yields 3500 (i.e. value 444) as the threshold. Use of a fitted exponential tail as described above (i.e. extrapolation) enables establishing thresholds for statistical significance levels that cannot be determined by use of percentiles computed over available measurements. Several embodiments compute an estimate $x_{0.9999}$ of a system performance metric for four nines i.e. 0.9999 (1 in 10,000) significance level, based on a subset containing far less than 10,000 measurements. Hence, use of a fitted exponential tail eliminates the need for large numbers of measurements which otherwise require a large amount of time to accumulate.

Significance level is expressed in several embodiments in terms of "the number of 9's", i.e. a number of 9s following the decimal point in writing the value of a probability p. For any general value p between 0 and 1, the value of p expressed in units of 9s is given by $-\log_{10}(1-p)$. For $\alpha = 1 - (m/n)$ which is the fraction at which tail fitting starts, (e.g. $\alpha = 0.05$ when m is the rank at $95^{th}$ percentile), the standard deviation σ of the error in 3 9's estimate, i.e. the standard error is $1.70/\sqrt{1-m}$ while that of the 49's estimate is $2.70/\sqrt{1-m}$. Note that the values 1.70 and 2.70 are obtained as follows. The standard error σ in units of 9s of estimation of $x_p$ (the pth level of significance), such as an estimated $x_{0.999}$ is approximated by the following:

$$\frac{1}{\sqrt{1-m}} \frac{\log\left(\frac{\alpha}{1-p}\right)}{\log 10}$$

To consider the number of measurements in a set to be sufficient for 3 9s and 4 9s estimations of the type described herein, some embodiments ensure that there is at least one sigma separation between two adjacent bands of variability around estimates, e.g. a first band, in the variability for a 3 9s estimate, and a second band in the variability for a 4 9s estimate, i.e. 2a <1 (where the value 1 and the value of σ are both in units of 9s). To satisfy this condition, for reasonable 3 9s estimates these embodiments use a sample size of at least 290 measurements and for 4 9s estimates at least 730 measurements. One embodiment uses 700 (i.e. seven hundred) measurements in each set (as shown in Appendix A below), for both three 9s and four 9s estimates used as thresholds.

As noted above, in several embodiments, such values with high significance (3 9s and 4 9s) are stored persistently in a database (as per act 317 in FIG. 3B). Next, computer 250 computes and sets thresholds (as per act 304 in FIG. 3A) in a process that is independent of the above-described process for computing and storing the percentiles and statistics (as per acts 303A–303Z). Specifically, in act 304, computer 250 of some embodiments performs acts 311–315 as discussed next. In act 311, the computer waits for a period specified by granularity for setting thresholds (e.g. 1 hour or on a specified event).

Next, the computer 250 uses the information previously persisted in the database (i.e. in acts 312, 315 and 317), and user-specified parameters (e.g. critical at 4 nines based on exponential tail coefficients, or warning at 115% of 2 nines significance level based on ranking) to compute the thresholds. Thereafter, computer 250 invokes an assessment function (see act 313 in FIG. 3C) to evaluate the quality of the model parameters.

When performing the assessment function, computer 250 decides on whether specific estimated exponential thresholds are sufficient to be used as the basis for alerting. The assessment function in some embodiments is based on a measure of goodness of fit of the fitted exponential tail to the actual measurements, as well as the number of measurements in the subset (called "cardinality") used in curve fitting. When either goodness of fit or cardinality are insufficient to ensure reasonable confidence in the estimate (as evaluated by application of one or more predetermined rules), the computer of such embodiments is programmed to either unset or not set alert thresholds using these statistics (in accordance with previously specified user preference). Appendix Z below provides pseudocode for an assessment function that is used in some embodiments of the invention.

Some embodiments of computer 250 compute a value for the mean μ=1/λ twice for two different portions of the exponential tail, from two different subsets of measurements in two different predetermined percentage ranges. For example, one value for the mean is computed based on measurements in the percentile range 95–97%, whereas another value for the same mean is computed based on measurements in the 97–99% range. To the extent that these two values for the mean agree with one another (e.g. within a predetermined tolerance), the exponential tail identified from the measurements is deemed to be a good fit, and used to set thresholds. If $\mu_1$ and $\mu_2$ are the two estimates (called "half-tail" estimates) of p based on two halves of a subset of measurements, and then their average ½ ($\mu_1+\mu_2$) is an overall estimate for μ obtained from the entire subset (called "full tail" estimate). If an exponential distribution applies, the central limit theorem indicates that both $\mu_1$ and $\mu_2$ are independent and normally distributed with mean p and variance $(2/(1-m)) \mu^2$ because ½ (1−m) points are used in each half-tail estimate. Note that $\mu_2$ is mathematically derivable from μ and $\mu_1$, and is derived therefrom in some embodiments.

Hence, one such embodiment uses a chi-squared statistic as a measure of goodness of fit. The smaller the value of this statistic, the better the fit. In this embodiment, the chi-squared statistic value when set to, for example, 3 or 4, results in an acceptance rate of (i.e. a rejection confidence) of 91.7% and 95.4% respectively, for the tail fitting that has been done (i.e. the estimated exponential tail parameters). When using the rejection confidence of 4, such embodiments may use the inequality formula (4) listed above as a criterion, wherein the single bar denotes absolute value. Thus if the sample size of measurements used in curve fitting is (l−m)=40 (i.e. if there are 1000 measurements in a set and the tail is being fitted in the range 95%–99%) these embodiments reject the exponential tail parameters that have been estimated if a half-tail estimate of the mean differs from the full-tail estimate of the mean by more than 32%.

On completion of the assessment function, computer 250 has decided whether or not the model parameters are acceptable. If acceptable, the computer 250 sends thresholds (see act 314 in FIG. 3C), to a program that generates alarms and/or warnings (such as the Enterprise Manager Agent or the Database server). Note that a threshold is updated, in some embodiments, only if the threshold has changed (i.e. un-changed thresholds are not updated). If not acceptable, computer 250 performs a user-specified action for this situation, e.g. either preserve the previous thresholds or unset previous thresholds (see act 315 in FIG. 3C).

On completion of percentile computation and setting of thresholds (as per acts 303A–303Z and 304), computer 250 waits for a preset duration (as per act 305 in FIG. 3A) or for a preset event to occur (e.g. the time becomes the top of the hour), and thereafter checks whether or not a moving window is in use. If a moving window is in use, computer 250 returns to acts 302A–302Z so as to re-partition the measurements, followed by curve fitting to obtain percentiles (as per acts 303A–303Z and 304–306). If a moving window is not in use, computer 250 returns to act 304 to re-compute the thresholds.

Note that application of the thresholds to measurements is not shown in FIGS. 3A–3C because this activity is performed asynchronously, relative to the methods of FIG. 3A–3C. In the example illustrated in FIGS. 4A and 4D, if measurements 404 and 405 are obtained after value 434 is set as the threshold, then they would be identified as statistically significant events, because they exceed value 434.

Hence, several embodiments of the invention identify metric values that are "unusual" as potential indicators of problems to be alerted about. Here, unusual means statistically significant and not just large in some arbitrary sense. In such embodiments, the computer is programmed to automatically fit previous metric values to the exponential tail of an exponential distribution that is then used to determine the statistical significance of future observations for alerting purposes. Alert thresholds are implemented in the programmed computer based on statistical significance levels at different orders of magnitude, and typical values are:

WARNING=0.999 ("three nines")

CRITICAL=0.9999 ("four nines").

Hence, a fitted exponential tail is used to find thresholds (in the same units as the measurements) for the just-described two statistical significance levels in some embodiments, and the thresholds are used to generate and display alerts to system administrators in the usual manner (e.g. as email messages or messages in an application that shows each message in a single line in an array of such lines). In certain embodiments, values at such statistical significance levels are used as boundaries of predetermined ranges of percentiles for use in generating a graphical display over time, as described in the concurrently filed co-pending patent application entitled "GRAPHICAL DISPLAY AND CORRELATION OF SEVERITY SCORES OF SYSTEM METRICS", by John M. Beresniewicz, Amir Najmi and Jonathan F. Soule.

The method illustrated in FIGS. 3A–3C is used to program a computer system 500 of the type illustrated in FIG. 5A which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer system 500 further includes a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, transportation planning is performed by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein and illustrated in FIGS. 3A–3C. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave (such as an electromagnetic wave) as described hereinafter, or any medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 (not shown in FIG. 5A) typically provides data communication through one or more networks to other data devices. For example, network link 520 (not shown in FIG. 5A) may provide a connection through local network 522 to a host computer 525 or to data equipment operated by an Internet Service Provider (ISP) 526. ISP 526 in turn provides data communication services through the world wide packet data communication network 528 (not shown in FIG. 5A) now commonly referred to as the "Internet". Local network 522 and network 528 (not shown in FIG. 5A) both use electrical, electromagnetic or optical signals that carry digital data streams. The signals through the various networks and the signals on network link 520 (not shown in FIG. 5A) and through communication interface 515 (not shown in FIG. 5A), which carry the digital data to and from computer system 500, are exemplary forms of carrier waves transporting the information.

Computer system 500 can send messages and receive data, including program code, through the network(s), network link 520 and communication interface 515. In the Internet example, a server 550 might transmit a mission (which is part of a transportation plan) through Internet 528 (not shown in FIG. 5A), ISP 526, local network 522 and communication interface 515.

The instructions for performing the methods of FIGS. 3A–3C may be executed by processor 505 as they are received, and/or stored in storage device 510, or other non-volatile storage for later execution. In this manner, computer system 500 may obtain the just-described instructions and any related data in the form of a carrier wave.

Figure 5A:
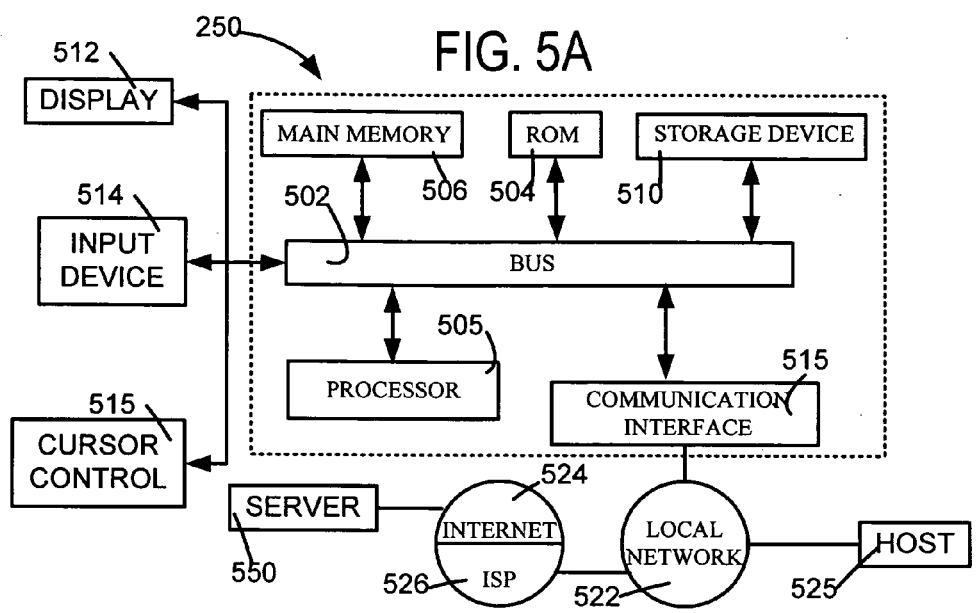
FIGS. 5A and 5B illustrate, in block diagrams, hardware and software portions of a computer that performs the method illustrated in FIG. 3A–3C.
Figure 5B:
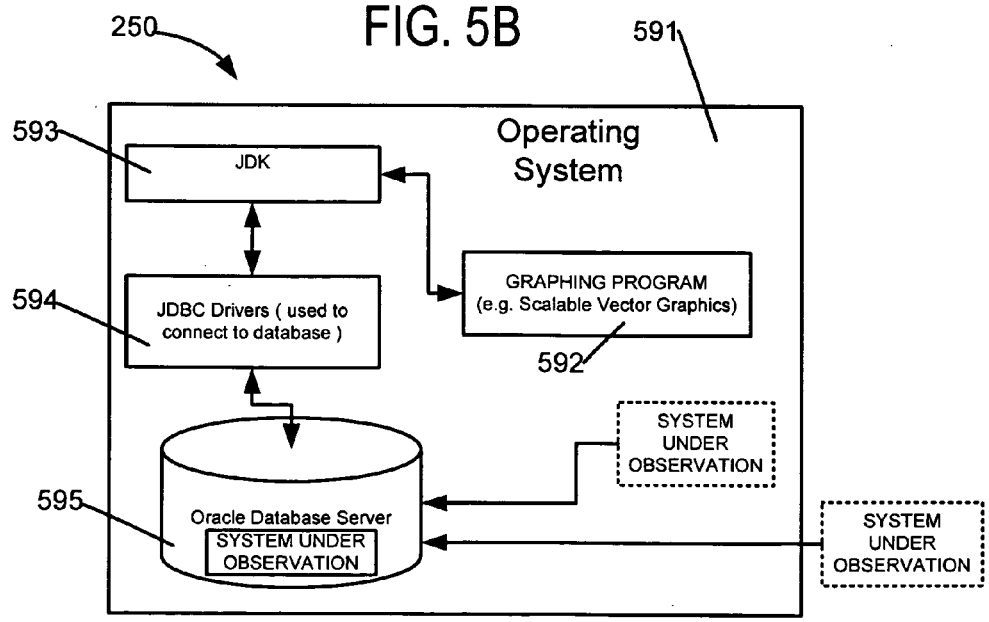

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), graphing program 592 (e.g. Scalable Vector Graphics), and JDBC drivers 594 (e.g. JDBC driver available from Oracle Corporation).

One embodiment in accordance with the invention has the following advantages over prior solutions: a) detects performance issues and raises alerts based on statistically significant events, rather than arbitrary or subjective thresholds (and hence this embodiment is superior at detecting truly abnormal situations that may deserve attention); b) is based on sound statistical principles, rather than simplistic arithmetic comparisons; c) is adaptive to both regular expected variations as well as gradual system evolution over time, rather than requiring manual intervention to effect adjustments; d) is simpler to configure as input parameters are metric-independent and thus do not depend on detailed knowledge by users of underlying metrics; e) is robust in that exponential tail modeling can produce reasonable estimates of non-exponential long-tailed distributions and can be computed over relatively sparse sample sizes.

The just-described embodiment also provides a) superior alerting: dynamic statistical baselines are expected to significantly improve the accuracy of performance alerting while also reducing exposure to the false positives commonly incurred under fixed threshold schemes; b) improved manageability: fixed thresholds induce management overhead that is proportional to both the number of targets and the number of performance metrics monitored (statistically determined thresholds using dynamic baselines can be configured with a few decisions applied over many targets and metrics); c) technology neutral: the statistical techniques introduced by the project are technology neutral with respect to the monitored target (the functionality is designed as a service that can be leveraged within Oracle Enterprise Manager across targets); d) customer acceptance: customers easily understand the basic concepts and recognize the value provided by self-adjusting statistical thresholds using dynamic baselines; e) market leadership: some smaller vendors have begun to adopt similar techniques.

Some embodiments of the invention contain an implementation of estimator computation, as illustrated in Appendix C below. Such embodiments implement a function "extract_compute_statistics" that accepts streams of raw data measurements as input (e.g. as a cursor defined over a table of persisted measurements in order of data source identifier, i.e. one metric's time series after another metric's time series) and returns the exponential tail parameters and other statistics computed over groups defined by data source and a group code (e.g. as produced by time partitioning functions as discussed above). In one embodiment such a function takes the form of an Oracle table function with a cursor variable input type and returns a nested table of statistics object type as output. Appendix C illustrates, in pseudo-code, processing logic implemented in certain embodiments.

Figure 6:
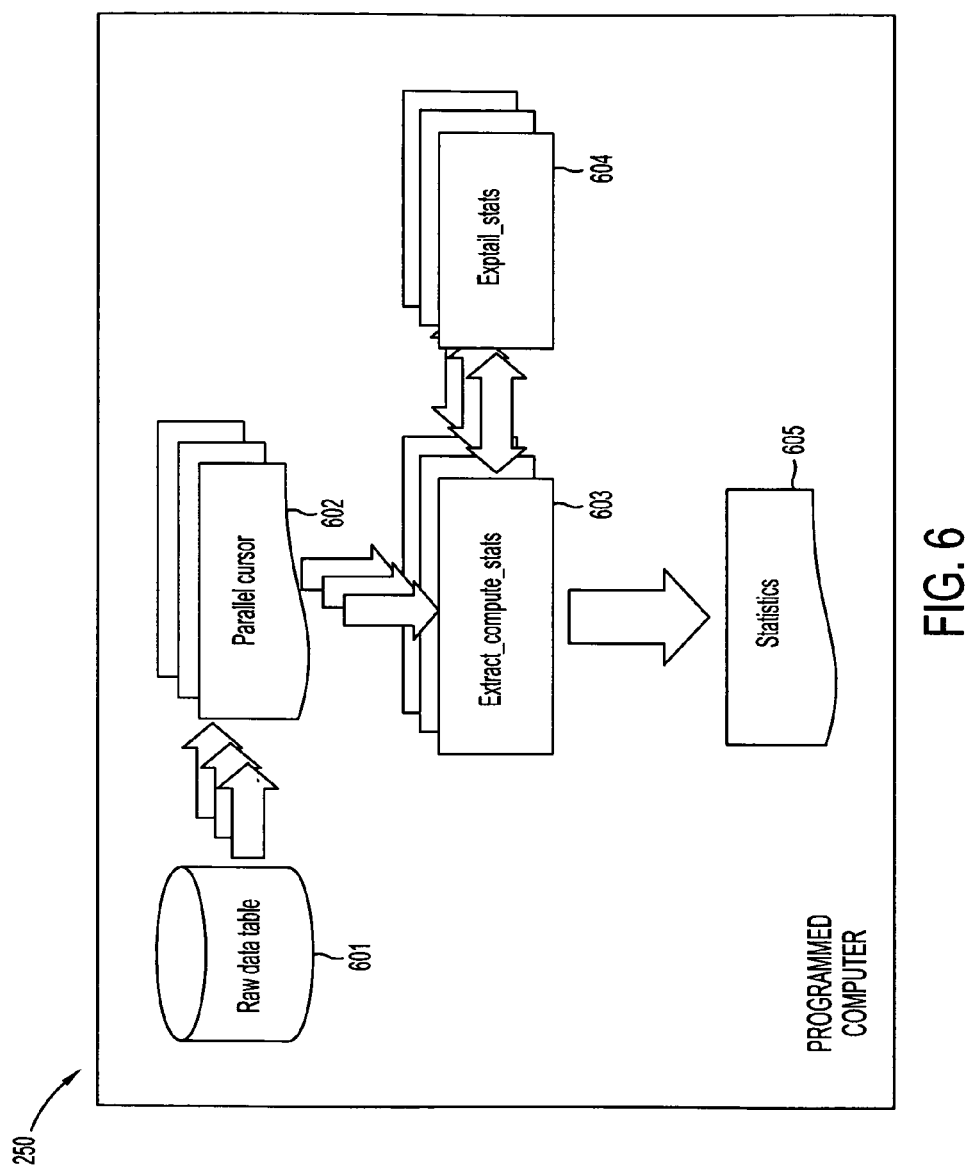
FIG. 6 illustrates, in a block diagram, a programmed computer of one illustrative embodiment which implements a parallel implementation that estimates threshold from measurements using an exponential tail.

One such embodiment, illustrated in FIG. 6, implements a parallelized version of the processing logic. This embodiment declares the table function such that it can execute in parallel in separate Oracle processes using Oracle parallel query features. In this embodiment each computing process generates all statistics for each of some data sources (i.e. some metrics) represented in the input measurement stream. From among all measurements generated by the system under observation (and held in a table 601 in computer 250 shown in FIG. 6), the measurements for a given data source identifier (e.g. a given database and a given metric) are directed to the same compute process, via a parallel-executing cursor 602 (invoked in computer 250, as shown in FIG. 6). For example, if there are two processes, a first process generates statistics for all sets of the metric disk reads per second from database "A" and a second process generates statistics for all sets of the metric SQL queries per second from database "B".

Specifically, the baseline statistics (including exponential tail estimates) are computed (in steps 603 and 604 shown in FIG. 6 and performed by computer 250) using technologies that allow computation to be spread in parallel across multiple CPUs and even across nodes, e.g. in an Oracle RAC configuration. The statistical computation itself likewise takes advantage of features that enable statistics (such as minimum, maximum, average, standard deviation, and basic percentiles) to be computed in a single SQL SELECT statement. The parallel implementation uses the two PL/SQL functions (illustrated by steps 603 and 604 in FIG. 6 and described in Appendices B and C) that work together to compute the statistics as described below.

Function "EXTRACT_COMPUTE_STATS" (see step 603 in FIG. 6) is declared with the PARALLEL_ENABLE clause. PARALLEL_ENABLE allows parallelism in the input cursor to dictate parallelism in the function execution. That is, if the input cursor named extract_cv is executing in parallel, then the function is invoked in parallel by the same Oracle processes executing over the input cursor. Since it is necessary for any given process to have all measurements from any given data source identifier's time series, the input cursor's data is split across processes by a hash function on the data source time series identifier. Every input row for a given time series will be identically hashed and thus assigned to the same parallel slave process for statistics computation. The function is also declared as PIPELINED. This allows it to fetch data in batches, compute results for those batches, and output results prior to fetching more batches. Proper batching of the data by time series is ensured by a CLUSTER declaration that specifies data be clustered by time series (the function is supplied all rows for a given time series before rows from another time series are supplied.) A PL/SQL signature of this function appears below.

Note in this signature that datasource_guid referred to in the CLUSTER declaration represents an identifier for the individual metric time series.

```
function extract_compute_stats
    (extract_cv in extract_cvtype
    ,compute_date_in in date := SYSDATE)
return bsln_statistics_set
PIPELINED
CLUSTER extract_cv by (datasource_guid)
PARALLEL_ENABLE
    (PARTITION extract_cv BY HASH(datasource_guid));
```

The parallelism of function "EXTRACT_COMPUTE_STATS" is driven by the cursor variable extract_cv and the cursor variable's parallelism can be driven by setting degree of parallelism at the table level for the main table referenced by the query. The number of parallel slaves executing the function can be tuned from outside the function execution context.

A second function called "EXPTAIL_STATS" (see step 604 in FIG. 6) performs the statistical calculations on a batch of time series data and returns statistics rows as output. This function uses analytic functions available in the computer system, and nested inline views to accomplish the full computation within a single SELECT statement. The following analytic functions are used: CUME_DIST, ROW_NUMBER, PERCENTILE_DISC, MAX, MIN, AVG, and STDDEV. The algorithm of the embodiment of this function is documented in Appendix B. The "fit quality" is a number that normalizes the goodness of fit over a range 0–100 for ease of comparison.

Numerous modifications and adaptations of the embodiments described herein will become apparent to the skilled artisan in view of this disclosure.

Although receipt from a human of an appropriate time partitioning scheme is described above in some embodiments, in alternative embodiments, the computer is programmed to automatically check for several types of periodicities in the measurements (e.g. by applying a correlation function thereof), and use the automatically identified periodicities to partition the available measurements into the appropriate number of sets. Although in some embodiments, the fitted exponentially decaying tail is used to detect and alert anomalous system behavior, other embodiments use the fitted tail to perform other functions, such as system sizing and capacity planning, and establishing service level agreements.

Numerous modifications and adaptations of the embodiments described herein are encompassed by the scope of the invention.

Although the above description refers to exponential tails that are used in many embodiments, other embodiments of the type described herein may use functions in which the tail is non-exponential but nonetheless a heavy tail (as in a Weibull Distribution, or Lognormal Distribution).

APPENDIX A

```
type [raw measurement data] is object
    (data source identifier
    ,measurement timestamp
    ,measurement value
    )
```

APPENDIX A-continued

```
type [raw measurement data table] is table of [raw
measurement data]
type [time_interval] is object
    (begin time
    ,end time
    )
type [set_of_intervals] is table of [time_interval]
SELECT
    [measurement data rows]
FROM
    [raw measurement data table] D
    ,[set of intervals] I
WHERE
    D.measurement timestamp
        BETWEEN I.begin_time AND I.end_time
```

APPENDIX B

```
TYPE observation IS OBJECT
    (timeseries id       raw(16)
    ,timeperiod id       raw(16)
    ,timegroup code      raw(21)
    ,obs_time            date
    ,obs_value           number
    )
TYPE observation set IS TABLE OF observation
TYPE statistics obj IS OBJECT
    (timeperiod id       raw(16)
    ,timeseries id       raw(16)
    ,compute date        date
    ,timegroup code      raw(21)
    ,sample_count        number
    ,average             number
    ,minimum             number
    ,maximum             number
    ,standard_deviation  number
    ,pctile_25           number
    ,pctile_50           number
    ,pctile_75           number
    ,pctile_90           number
    ,pctile_95           number
    ,pctile_99           number
    ,estimator_sample_count   number
    ,estimator_parm1     number
    ,estimator_parm2     number
    ,estimator_fit_quality   number
    ,estimator_pctile_999    number
    ,estimator_pctile_9999   number
    )
TYPE statistics set IS TABLE OF statistics obj
    SELECT
        [Z.statistics grouping attributes]
        ,[Z.retained full set statistics]
        ,[Compute
            μ, β, μ1, goodness-of-fit-test]
    FROM
        (SELECT [Compute
            Sum_{k=m to j} x_k]
            ,[Y.full set statistics]
            ,[Y.statistics grouping attributes]
        FROM
        (SELECT [Compute
                m, l, j, x_j, x_m, x_l,
                Sum_{k=m to l} x_k]
            ,[X.full set statistics]
            ,[X.statistics grouping attributes]
        FROM
        (SELECT
            [statistics grouping attributes]
[1]         ,[compute: full set statistics]
            ,[x_k = measurement value]
            ,[k = rank of the measurement]
        FROM
            TABLE [input observation set]
```

APPENDIX B-continued

```
              GROUP BY
                      [statistics grouping attributes]
              ) X
              WHERE
                      X.Cumulative_distribution >=
tail_low_percentile
                      AND X.Cumulative_distribution <=
tail_high_percentile
              ) Y
      ) Z
```
[1] One embodiment computes the following statistics over the entire input observation set (i.e. not limited to the "tail" but over all measurements in a set) grouped by statistics id information using Oracle analytic functions.

```
[full set statistics] =
    [
      sample_count        number
      ,average            number
      ,minimum            number
      ,maximum            number
      ,standard deviation number
      ,pctile_25          number
      ,pctile_50          number
      ,pctile_75          number
      ,pctile_90          number
      ,pctile_95          number
      ,pctile_99          number
    ]
[statistics grouping attributes] =
    [
      timeseries id
      ,timeperiod id
      ,timegroup code
    ]
```

APPENDIX C

Signature:
Function extract_compute_statistics
    (input cursor of measurement observations in data source order)
Return
    (output statistics data computed by data source and grouping code)
Input:
    [open cursor of measurement observations]
Local variables:
    [l_observation_set] nested table of observations within function
    [l_statistics_set] output variable for the function
Logic:
```
      LOOP
          FETCH FROM
              [open cursor of measurement observations]
              INTO [l_observation_set]
              EXIT loop when cursor empty
[1]       IF [compute batch is full]
          THEN
              [l_statistics_set] =
exponential_tail_statistics(l_observation_set])
[2a]          output [l_statistics_set]
          END IF
      END LOOP
      IF [final batch non-empty]
      THEN
          [l_statistics_set] =
exponential_tail_statistics(l_observation_set])
```

APPENDIX C-continued

```
[2b]          output [l_statistics_set]
          END IF
          CLOSE [open cursor of measurement observations]
          RETURN from function
```
Notes on above characterized embodiment by numbered pseudo-code location.
[1] In this embodiment compute batches (e.g. a batch for each metric and/or for each set of a metric) are formed by loading all measurements for a given data source together into [l_observation_set] before calling the exponential_tail_statistics function.
[2a], [2b] In this embodiment the function extract_compute_statistics uses Oracle pipelined function feature to incrementally return statistics output rows incrementally as batches are processed. Such pipelining allows incremental batching (e.g. for each metric and/or for each set of a metric).

What is claimed is:

1. A computer implemented method of determining a threshold for a metric, the method comprising:
    partitioning a plurality of measurements of the metric into a number of sets including a set, the set comprising measurements collected during a plurality of intervals of time;
    selecting a subset of measurements from the set whose rank occurs within a predetermined percentile range;
    fitting measurements in the subset to a statistical distribution function having a tail that decays slower than a normal distribution, to obtain at least two parameters thereof;
    computing, based on said at least two parameters, a value of the metric at a predetermined probability outside of the predetermined percentile range; and
    performing an action when a new measurement of the metric, in a new interval of time corresponding to the set, crosses said value obtained from the computing.

2. The method of claim 1 wherein:
    a lower limit of the predetermined percentile range is greater than or equal to 90%; and
    an upper limit of the predetermined percentile range is less than the predetermined probability.

3. The method of claim 1 wherein:
    each interval in the plurality of intervals is separated from another interval in the plurality of intervals, by a common predetermined duration.

4. The method of claim 1 further comprising:
    displaying to an operator a plurality of schemes for partitioning measurements based on time; and
    receiving, from the operator, a scheme selected from the plurality of schemes.

5. The method of claim 4 wherein the plurality of schemes comprise at least one of:
    a daily partition that divides up measurements made during each day; and
    a weekly partition that divides up measurements made during each week.

6. The method of claim 5 wherein the daily partition is one of:
    each hour of the day;
    day and night; and
    entire day.

7. The method of claim 5 wherein the weekly partition is one of:
    each day of the week;
    weekday and weekend; and
    entire week.
    entire week.

8. The method of claim 5 wherein at least one scheme in the plurality of schemes is related to a periodicity induced by human usage of a system.

9. The method of claim 5 wherein at least one scheme in the plurality of schemes is related to a periodicity induced by scheduled jobs of a system.

10. A computer-readable storage medium encoded with instructions to determine a threshold for a metric, the instructions comprising:
   partitioning a plurality of measurements of the metric into a number of sets including a set, the set comprising measurements collected during a plurality of intervals of time;
   selecting a subset of measurements from the set whose rank occurs within a predetermined percentile range;
   fitting measurements in the subset to a statistical distribution function having a tail that decays slower than a normal distribution, to obtain at least two parameters thereof;
   computing, based on said at least two parameters, a value of the metric at a predetermined probability outside of the predetermined percentile range; and
   performing an action when a new measurement of the metric, in a new interval of time corresponding to the set, crosses said value obtained from the computing.

11. The computer-readable storage medium of claim 10 wherein:
   a lower limit of the predetermined percentile range is greater than or equal to 90%; and
   an upper limit of the predetermined percentile range is less than the predetermined probability.

12. The computer-readable storage medium of claim 10 wherein:
   each interval in the plurality of intervals is separated from another interval in the plurality of intervals, by a common predetermined duration.

13. The computer-readable storage medium of claim 10 wherein said instructions further comprise:
   displaying to an operator a plurality of schemes for partitioning measurements based on time; and
   receiving, from the operator, a scheme selected from the plurality of schemes.

14. The computer-readable storage medium of claim 13 wherein the plurality of schemes comprise at least one of:
   a daily partition that divides up measurements made during each day; and
   a weekly partition that divides up measurements made during each week.

15. The computer-readable storage medium of claim 13 wherein at least one scheme in the plurality of schemes is related to a periodicity induced by human usage of a system.

16. The computer-readable storage medium of claim 13 wherein at least one scheme in the plurality of schemes is related to a periodicity induced by scheduled jobs of a system.

* * * * *